United States Patent
Ardron et al.

(10) Patent No.: US 9,764,350 B2
(45) Date of Patent: Sep. 19, 2017

(54) METROLOGICAL SCALE

(71) Applicant: RENISHAW PLC, Wotton-under-Edge, Gloucestershire (GB)

(72) Inventors: Marcus Ardron, Stroud (GB); Richard John Hoodless, Bristol (GB); David Jonathan Walshaw, Dursley (GB)

(73) Assignee: RENISHAW PLC, Wotton-under-Edge (GB)

( * ) Notice: Subject to any disclaimer, the term of this patent is extended or adjusted under 35 U.S.C. 154(b) by 0 days.

(21) Appl. No.: 14/707,282

(22) Filed: May 8, 2015

(65) Prior Publication Data

US 2015/0239002 A1 Aug. 27, 2015

Related U.S. Application Data

(62) Division of application No. 12/936,996, filed as application No. PCT/GB2009/001014 on Apr. 21, 2009, now Pat. No. 9,057,630.

(30) Foreign Application Priority Data

Apr. 21, 2008 (GB) .................................. 0807242.3

(51) Int. Cl.
  *B05C 11/10* (2006.01)
  *B32B 41/00* (2006.01)
  (Continued)

(52) U.S. Cl.
  CPC ............ *B05C 11/1005* (2013.01); *B05C 9/12* (2013.01); *B05C 9/14* (2013.01); *B32B 41/00* (2013.01); *B41J 3/407* (2013.01); *B41J 11/002* (2013.01); *B41J 11/46* (2013.01); *G01D 5/34707* (2013.01); *B32B 37/12* (2013.01);
  (Continued)

(58) Field of Classification Search
  CPC ......... B32B 37/12; B32B 41/00; B41F 33/00; B41J 11/002; B41J 11/46; B41J 3/407; B41P 2200/31; B41P 2233/50; C23C 16/52; G01B 3/004; G01D 5/347;
  (Continued)

(56) References Cited

U.S. PATENT DOCUMENTS

| | | | |
|---|---|---|---|
| 5,088,209 A | 2/1992 | Lummes et al. | |
| 2003/0119179 A1 | 6/2003 | Okamoto et al. | |
| 2007/0240325 A1 | 10/2007 | Pelsue et al. | |

FOREIGN PATENT DOCUMENTS

| | | |
|---|---|---|
| EP | 0 207 121 B1 | 1/1990 |
| EP | 1 323 529 A1 | 7/2003 |

(Continued)

OTHER PUBLICATIONS

Heidenhain LIDA 200 series, pre Apr. 21, 2008, (video on CD-ROM), which was found at http://www.auto-met.com/heidenhain/exposed/default.htm.

(Continued)

*Primary Examiner* — George Koch
(74) *Attorney, Agent, or Firm* — Oliff PLC

(57) ABSTRACT

A method of applying a marking onto a metrological scale. The method includes locating one or more markings on the scale substrate in a provisional state; checking whether the one or more markings located on the scale substrate are acceptable; and finalizing the one or markings which are acceptable so as to transform the one or more markings into a finalized state.

31 Claims, 9 Drawing Sheets

(51) Int. Cl.
  *B41J 3/407* (2006.01)
  *B41J 11/00* (2006.01)
  *B41J 11/46* (2006.01)
  *B05C 9/12* (2006.01)
  *B05C 9/14* (2006.01)
  *B32B 37/12* (2006.01)
  *G01D 5/347* (2006.01)

(52) U.S. Cl.
  CPC ....... *B32B 2041/04* (2013.01); *B41P 2200/31* (2013.01); *B41P 2233/50* (2013.01); *G01D 5/347* (2013.01); *G01D 5/34746* (2013.01); *G01D 5/34776* (2013.01); *G01D 5/34784* (2013.01)

(58) Field of Classification Search
  CPC ........... G01D 5/34707; G01D 5/34746; G01D 4/34776; G01D 5/34784
  USPC ............... 156/64; 118/712; 205/645; 33/706, 33/707; 427/8, 427.2
  See application file for complete search history.

(56) References Cited

FOREIGN PATENT DOCUMENTS

| | | |
|---|---|---|
| EP | 1 905 600 A2 | 4/2008 |
| GB | 2 353 759 A | 3/2001 |
| JP | 56-127788 A | 10/1981 |
| JP | 2005-321218 A | 11/2005 |
| JP | 2008-536135 A | 9/2008 |
| WO | 02/084223 A1 | 10/2002 |
| WO | 2005/124282 A2 | 12/2005 |
| WO | 2006/109020 A1 | 10/2006 |

OTHER PUBLICATIONS

MicroE Mercury II system, "Index and Limit Marker Installation" and "Reworking to Correct Mistakes," pp. 29-31 and 35.
Numerik Jen LIA 20 system, LIA series pp. 35, 61 and 62.
RSF MS 20, RSF Elektronik Ges.m.b.H., pp. 3.
Heidenhain Product Information LIDA 200 series, Mar. 2006, pp. 1-4, which was found at http://www.lg-motion.co.uk/_assets/client/images/collateral/Heidenhain%20Brochure%20-%20LIDA%20Scales.pdf.
Mercury II The Next Generation of High-Performance Encoders, GSI MicroE Systems, 2007, pp. 1-8, which was found at http://www.microesys.com/m2encoders/pdf/Mercury_II_Encoders_Brochure.pdf.
Numerik Jena LIA Series Exposed Linear Encoder with Signal Control, Nov. 2004, pp. 1-37, which was found at http://www.numerikjena.de/en/downloads/BA_LIA_e.pdf.
RSF Elektronik MS 20 Open Linear Encoder with singlefield scanning, Feb. 2008, pp. 1-24, which was found at http://pdf.directindustry.com/pdf/rsf-elektronik/ms-20/15075-44764-_24.html.
Oct. 6, 2009 International Search Report issued in International Application No. PCT/GB2009/001014.
Oct. 6, 2009 Written Opinion of the International Search Authority issued in International Application No. PCT/GB2009/001014.
Sep. 24, 2011 Office Action issued in Chinese Patent Application No. 200980114104.02.
Translation of JP-A-127788 (Oct. 6, 1981).
May 28, 2013 Office Action filed in Japanese Patent Application No. 2011-505581.
Dec. 22, 2015 Office Action issued in European Patent Application No. 097350512.
Feb. 29, 2016 Human Translation of JP-A-56-127788.
Translation of JP-A-2005-321218.

METROLOGICAL SCALE

This is a Divisional of application Ser. No. 12/936,996 filed Oct. 8, 2010, now U.S. Pat. No. 9,057,630, which is a National Phase entry of International Application No. PCT/GB2009/001014 filed Apr. 21, 2009, which claims the benefit of British Application No. 0807242.3 filed Apr. 21, 2008. The disclosure of the prior applications is hereby incorporated by reference herein in its entirety.

The present invention relates to metrological scale, a method of manufacturing said scale and an apparatus for making markings on metrological scale. In particular, the invention relates to a metrological scale comprising markings and a method of applying markings to said scale.

A known form of scale reading apparatus for measuring relative displacement of two members comprises a scale on one of the members having scale marks defining a pattern and a readhead provided on the other member. An optical scale reading apparatus has a light source for illuminating the scale, a detector in the readhead responsive to resultant light patterns to produce a measure of relative displacement of the scale and readhead. A scale having its marks in a periodic pattern is known as an incremental scale and the readhead provides an output of up and down counts. For instance, such a scale is described in Published European Patent Application no. 0207121. A scale may be provided with reference marks which when detected by the readhead enable an absolute or unique position of the readhead to be determined. For example, such a scale is disclosed in Published International Patent Application WO 2005/124282. Mass produced scale may have an incremental track and a plurality of reference marks. The user may wish to use some of these reference marks but not others. A reference mark could be embedded within the incremental track, or it could be placed adjacent to the incremental track, for instance in a separate track.

Absolute scales are also known which typically comprise features defining a series of absolute codes. During use a readhead reads codes as it moves along the scale and translates the codes into absolute position information. Such a scale is disclosed in International Patent Application no. PCT/GB2002/001629. It can be useful in some circumstances to apply limit marks adjacent or on the scale so as to define the limit of relative movement of the readhead and scale.

In many machines, for example machine tools, the end points of movement of the machine part are defined by limit switches. These for example may be mechanical, magnetic or optical.

The present invention relates to improvements in the methods and apparatus for applying markings onto scale substrates.

According to a first aspect of the invention there is provided a method of applying a marking onto a metrological scale, comprising: locating one or more markings with respect to the scale substrate in a provisional state; checking whether the one or more markings located with respect to the scale substrate are acceptable; and finalising the one or more markings which are acceptable.

This method allows the marking to be checked before it is finalised. This is particularly advantageous if markings are being applied to the scale substrate in situ or added to material already processed to form a scale (e.g. incremental or absolute).

Finalising can comprise transforming the one or more markings into a finalised state. In other words the method can comprise subjecting the marking to a finalisation process in which the marking undergoes a transformation that makes the marking permanent, i.e. less readily removable from the scale than in its provisional state.

The form of the marking could change, e.g. transform, between its provisional and finalised state. For instance, the marking in its provisional state could be a liquid placed on the scale which can be activated during finalisation to cause it to react with the scale thereby permanently marking the scale. For instance, the liquid could be a selectively activatable etchant which when activated reacts with the scale substrate to change locally the form of the scale's substrate. For instance, the etchant could cause a smooth surface to become rough or vice versa. The etchant could erode a local area of the scale substrate in order to form a cavity.

Preferably, the form of the marking in its provisional and finalised states is substantially the same. The form can comprise the appearance of the marking, for instance the shape and size of the marking. In particular, preferably the form comprises the properties of the marking which are used for detection of the marking by a readhead. Accordingly, preferably finalising does not substantially alter the form of the marking. This can be advantageous as the checking step can then give a good indication of the quality of the finalised marking before it is actually finalised.

Finalising can comprise fixing the marking to the scale substrate so that it is less readily removable. This can comprise interacting with the marking to fix it to the scale. As explained in more detail below, fixing can comprise transferring the marking onto the scale. This could include causing the marking to bond with the scale.

Finalising can comprise subjecting the marking to at least one of pressure, a heat source, an electromagnetic radiation ("EMR") source and a chemical source. For instance, a pressure tool, such as a roller, could be used to apply pressure to the marking. Optionally, the pressure tool could comprise an impact apparatus. The impact apparatus could comprise an impact element having an end for placement against the marking. The impact end's profile can be substantially the same as the marking's profile. The impact apparatus could further comprise an impactor for applying an impact force to the impact element. The amount of pressure needed in order to finalise the marking will depend on many factors including, for example, the type of pressure sensitive adhesive used on the marking. Suitable pressures could be at least 5 N per 10 $mm^2$, preferably at least 10 N per 10 $mm^2$, more preferably at least 15 N per 10 $mm^2$, and preferably not more than 100 N per 10 $mm^2$, for example not more than 50 N per 10 $mm^2$. For instance, a suitable pressure could be approximately 20 N per 10 $mm^2$.

A heat source could be used to subject the marking to temperatures of at least 50° C., preferably at least 70° C., for instance at least 100° C. It can be preferable that the marking is not subjected to temperatures greater than 300° C., more preferably not greater than 200° C.

An EMR source could be used to expose the marking to EMR, for instance an optical source could be used to expose the marking to optical EMR. Optical EMR includes EMR in the range of infra-red to ultra-violet ("UV"). In particular, an Ultra-Violet ("UV") source could be used to expose the marking to UV EMR.

Finalising can comprise curing the marking. Suitable curing techniques include exposing the one or more markings to an EMR source. Suitable EMR sources include an optical source, such as a visible light source or a UV source. Other suitable curing techniques comprise: heat curing, e.g. exposing the one or more markings to a heat source; and chemical curing, e.g. exposing the one or more markings to a chemical which cures the marking.

Locating can comprise applying a marking onto the scale substrate using a reversible process. For instance, the marking in its provisional state might be a liquid applied to the scale substrate. Accordingly, applying can comprise applying a marking in a liquid state onto the scale substrate. The liquid could be a photo-curable liquid, in particular it could be a UV-curable liquid. The liquid can comprise an ink, for instance a photo-curable ink, or more particularly a UV-curable ink. In embodiments in which the marking in its provisional state is a liquid, finalising can comprise transforming a marking into a solid state. For example, finalising can comprise curing the one or more liquid markings.

The step of applying one or more markings to the scale substrate may include the step of pinning the marking. Pinning can help keep the marking in place without finalising it. This is especially useful when the marking in its provisional state is a liquid as it can prevent the liquid from flowing freely around the scale substrate. When the marking is in a liquid form in its provisional state then pinning can comprise forming a skin over the exposed surface of the marking so as to hold the form and position of the marking.

Applying can comprise applying a marking in a solid state. The marking can comprise an adhesive for securing the marking to the scale. In this case, finalising can comprise transforming the adhesive. Transforming the adhesive can comprise curing the adhesive.

Locating can comprise positioning a marking carrier adjacent the scale and finalising can comprise transferring the marking from the marking carrier onto the scale. For instance, the marking could comprise a piece of material having an adhesive on at least one side, e.g. a sticker. Optionally, the marking could be a decal which can be transferred onto the scale substrate. Accordingly, in these cases the marking is transformed by it being transferred from the marking carrier onto the scale substrate. Finalising could comprise applying pressure to the one or more markings so that the marking becomes bonded, and hence transferred, to the scale substrate. Optionally, a thermal transfer could be used to cause localised melting and bonding of the marking carrier to the scale substrate. Accordingly, when the marking carrier is subsequently removed the localised area that has been subjected to the thermal transfer process remains on the scale substrate.

Preferably, when placed on the metrological scale, the marking carrier does not adversely affect the readhead's detection of the metrological scale's position features.

The marking carrier could comprise a layer of material to which the marking is removably attached. For instance, the marking carrier could be sheet-like. Preferably, the marking is carried on the underside of the marking carrier. Preferably, the layer of material permits the detection of the metrological scale's position features therethrough.

Preferably, the surface area of the underside of the marking carrier is larger than that of the marking. Preferably, the surface area of the underside of the marking carrier is at least twice the size as that of the marking, more preferably at least three times the size, for example at least four times the size. The underside of the marking carrier could comprise an adhesive for temporally securing the marking carrier to the scale during checking and/or finalising. Preferably, any adhesive on the marking carrier is different to any adhesive on the marking. Preferably, any adhesive on the marking carrier is weaker than any adhesive on the marking. In particular, preferably the marking carrier's adhesive is not curable by the method used to finalise the marking.

The marking carrier can comprise at least one removable backing layer which covers at least the marking's scale contact surface. Optionally, the at least one backing layer covers the marking carrier's scale contact surface, i.e. its underside. The same or separate backing layers could be used to cover the marking carrier and marking. In embodiments in which the marking comprises an adhesive, the backing layer is removable so as to expose the marking's adhesive. Preferably, in embodiments in which the marking carrier comprises an adhesive, the backing layer is removable so as to expose the marking carrier's adhesive.

Preferably, the marking carrier has greater rigidity than the marking material. Preferably, the marking carrier is substantially thicker than the marking material. Preferably, the marking carrier is at least two times thicker than the marking material, more preferably at least 10 times thicker. Preferably, the marking material is not more than 10 µm at its edges, more preferably not more than 5 µm at its edges, especially preferably not more than 2 µm at its edges, for example 1 µm at its edges. The marking material can be thinner at its edges than toward its middle. Optionally, the marking material has a substantially uniform thickness. Preferably, the marking carrier is at least 10 µm in thickness, more preferably at least 50 µm, especially preferably at least 100 µm, for example at least 200 µm.

Checking can comprise checking the position and/or orientation of the marking. Checking can comprise checking other characteristics of the marking. For instance, checking can comprise checking the size and/or clarity of the marking. It could also comprise, for instance, checking that the marking is complete and/or of the correct type or form.

Checking can comprise a detector detecting the marking and a processor device analysing the detected marking to determine if it complies with predetermined criteria. Checking whether the one or more markings are acceptable may be a visual check. It may be carried out manually by an operator. Checking may be automated. For instance, in embodiments in which the marking is a visual marking, the marking may be checked e.g. using a vision machine.

The method can further comprise removing any markings which are not acceptable.

Preferably, the metrological scale comprises a series of position features defining an incremental or absolute scale. Preferably, the one or more markings define a reference position on the incremental or absolute scale. The reference position can, for instance, be a boundary of relative movement between the scale and a readhead reading the scale. In this case the marking can be a limit mark. The reference position can be a unique reference point along the length of the scale. For instance, in the case of an incremental scale, the marking could comprise a reference mark which defines a reference point, for instance an absolute reference point, along the length of the incremental scale.

The metrological scale can be a magnetic or an inductive metrological scale. The metrological scale can be a capacitive metrological scale. Optionally, the metrological scale is an optical metrological scale. In this case, the metrological scale could be transmissive in which a readhead reads the scale via detecting light transmitted through the scale. Optionally, the metrological scale could be reflective in which a readhead reads the scale via detecting light reflected off the scale.

As will be understood, there are many suitable ways in which the position features can be defined on a scale. For instance, position features can be defined by features having particular electromagnetic radiation (EMR) properties, for example particular optical properties, for instance by the particular optical transmissivity or reflectivity of parts of the scale. Accordingly, a position feature could for example be defined by parts of the scale having a minimum reflectivity or transmissivity value. Optionally, a position feature could for example be defined by parts of the scale having a maximum reflectivity or transmissivity value. In the case of a magnetic metrological scale, position features can be defined by features having particular magnetic properties or for instance by the presence or absence of ferromagnetic material. In the case of capacitive scale position features can be defined by features having particular capacitive properties, and in the case of an inductive scale, position features can be defined by features having particular inductive properties.

The position features can take the form of lines, dots or other configurations which can be read by a readhead. Preferred configurations for one-dimensional scales can comprise lines extending across the entire width of a track in a dimension perpendicular to the measuring dimension.

Likewise, the one or more markings can take the form of lines, dots or other configurations.

Preferably, the marking can be cleaned but not removed with an appropriate cleaner. For instance, the cleaner could be a liquid, for instance a solvent. Preferably, the marking can be cleaned but not removed with a first solvent and removed with a second solvent. For instance, a marking in the form of a sticker may be applied to the scale. This sticker could be cleaned with isopropyl alcohol ("IPA") without damage and removed with, for example, acetone or xylene. Furthermore, the sticker could be finalised using, for example, heat. Optionally, a marking may be applied in a provisional state in the form of UV curable ink using a pen to draw the marking on the scale. The provisional marking may be cleaned with water and removed with IPA. Furthermore, the provisional marking could be finalized with UV light.

Accordingly, this application describes a method of producing markings on a scale substrate, comprising: applying one or more markings to the scale substrate using a reversible process, checking whether the one or more markings are of acceptable quality; and finalising the one or more markings which are of acceptable quality.

According to a second aspect of the invention there is provided an apparatus for applying a marking to a scale substrate, comprising: a scale locator for positioning the apparatus in a defined position relative to the scale substrate in at least one dimension; an applicator for locating one or more markings on the scale substrate in a provisional state; a detector for checking the markings; and a finaliser for finalising the one or markings which are acceptable so as to transform the one or more markings into a finalised state.

The apparatus can further comprise a remover for removing from the scale substrate one or more markings which are not acceptable.

Another aspect of the present invention provides apparatus for applying a marking to a scale substrate, the apparatus comprising: a scale locator for positioning the apparatus in a defined position relative to the scale substrate in one dimension; a reagent storage region; and an applicator which provides a conduit for the reagent from the reagent storage region to the scale substrate.

In a preferred embodiment, the applicator is configured to apply the reagent to the scale substrate in the desired shape of the marking. Preferably the desired shape of the marking is a line.

Preferably the applicator is movable between first and second positions. The first position may be in contact with the scale substrate when the scale substrate is engaged with the scale locator. The second position may be retracted.

The reagent storage region may be sized to contain sufficient reagent for one or multiple markings.

The reagent storage region and the applicator may be provided in one integral unit.

The apparatus may further comprise a curing source, for example an optical curing source.

According to a further aspect, the invention provides a kit of parts comprising: a scale comprising a series of position features; and an apparatus for applying a reference mark onto the scale, the apparatus carrying marker matter which can be applied to a scale substrate in a provisional state and subsequently transformable into a finalised state on the scale substrate via a finalisation procedure.

The apparatus can comprise a storage region for the marker matter and an applicator for transferring the marker matter from the storage region onto a scale substrate. For example, the marker matter can be a liquid and the applicator can comprise at least one conduit for transferring the marker liquid from the storage region onto a scale substrate.

The marker matter can comprise an object comprising an adhesive backing that is transformable into a finalised state on the scale substrate via a finalisation procedure.

The marker matter can be a decal and the apparatus can comprise a decal carrier sheet. Preferably, the decal carrier sheet is configured such that it does not interfere with the detection of markings on a scale substrate on which the decal carrier is placed.

The apparatus can comprise features for aiding alignment of the marking to the scale substrate. The apparatus can comprise a scale locator for positioning the apparatus in a defined position relative to the scale substrate in at least one dimension.

The kit can further comprise a tool for finalising the marking.

According to a yet further aspect of the invention there is provided an apparatus for applying a reference mark onto the scale, for use with a kit of parts as described above.

The invention will now be described with reference to the accompanying drawings in which:

FIG. 3(b) is a schematic illustration of a first way of carrying out the steps of the flow diagram shown in FIG. 3a;

FIG. 3(c) is a schematic illustration of a second way of carrying out the steps of the flow diagram shown in FIG. 3a;

FIG. 4 is a schematic illustration of a system suitable for automatically carrying out the method of 3a;

Figure 5A:
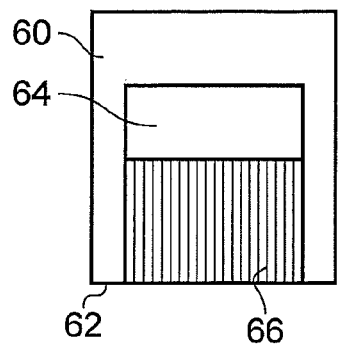
Figure 5B:
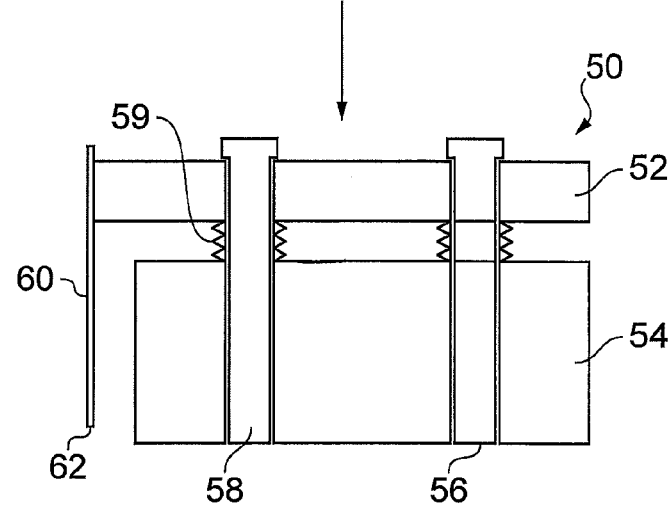
Figure 5C:
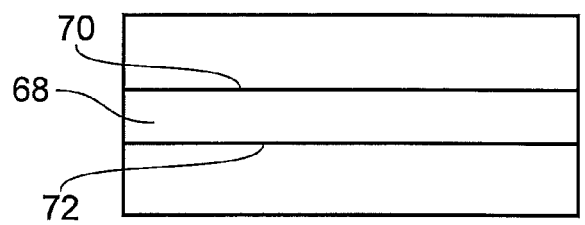
Figure 6:
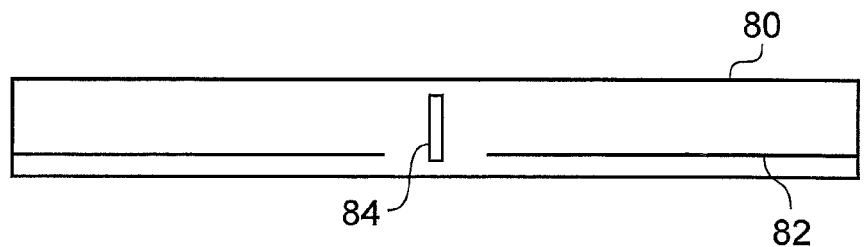
Figure 7:
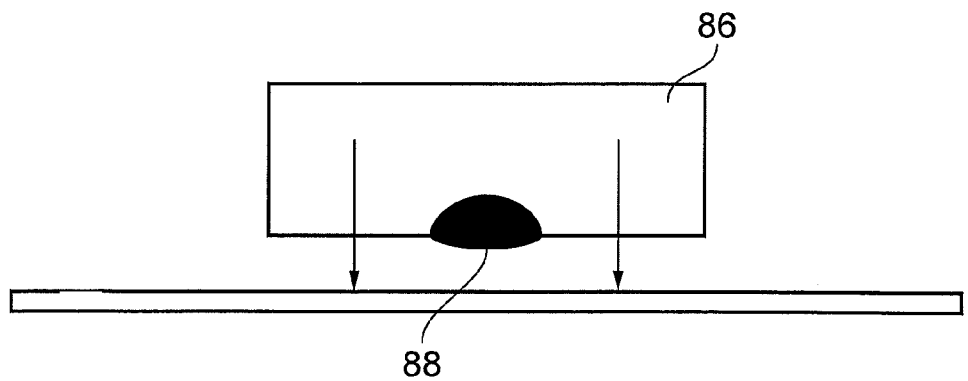
Figure 8:
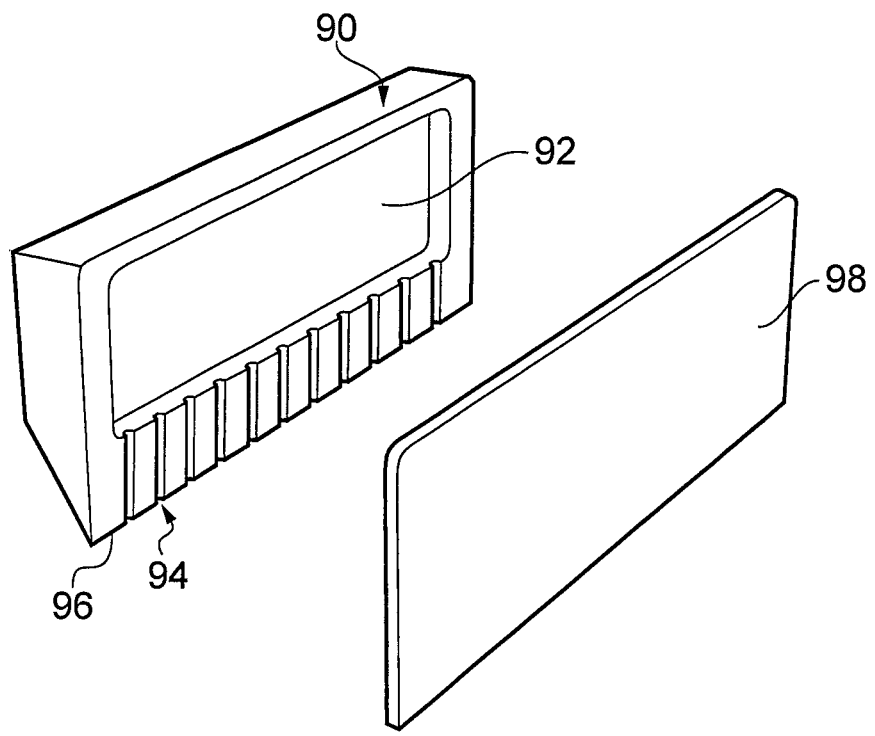
Figure 9:
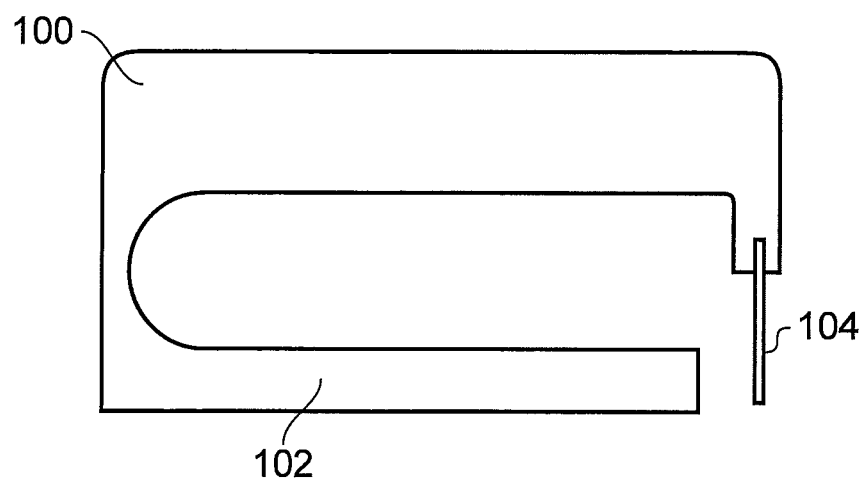

FIGS. 5(a), (b) and (c) illustrate end, side and bottom views respectively of a device for manually applying reference marks;

FIG. 6 illustrates a mask for applying the reference mark;

FIG. 7 illustrates a device for applying a reference mark by tampo printing;

FIG. 8 illustrates an alternative blade for use in FIG. 5;

FIG. 9 illustrates an alternative embodiment of the device in FIG. 5; and

Figure 10A:
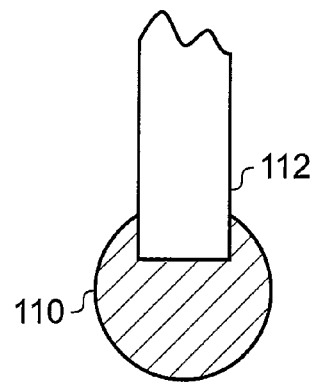
Figure 10B:
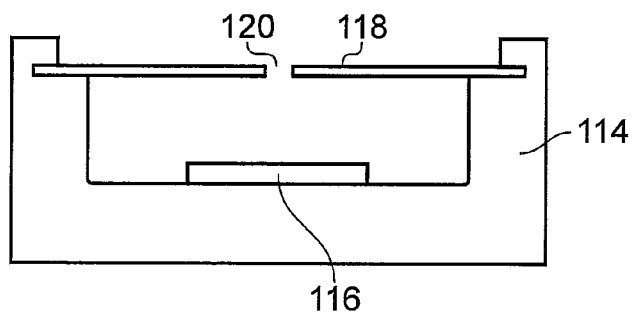
Figure 10C:
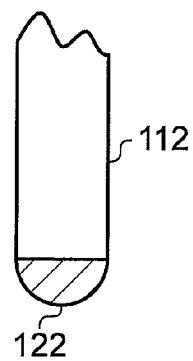

FIG. 10A-10C illustrate ink on a blade tip before scraping, a scraper and ink on a blade tip after scraping.

Figure 1:
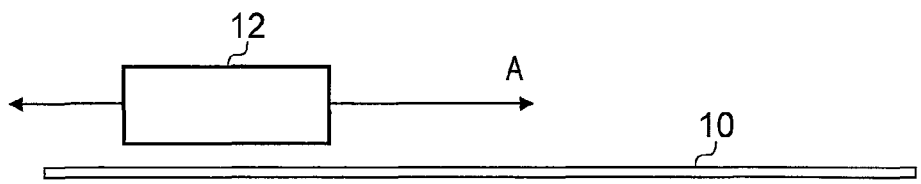
FIG. 1 is a side view of a scale and readhead.
Figure 2:
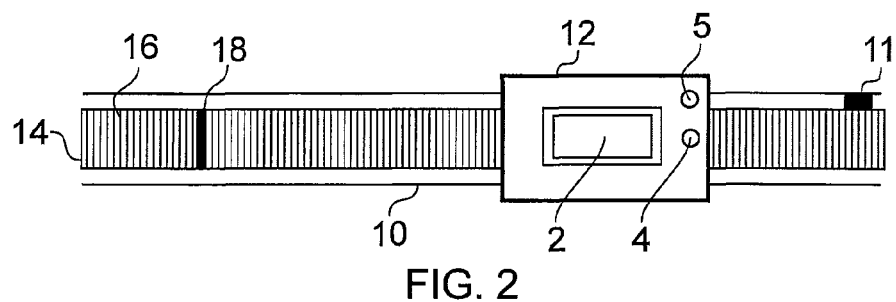
FIG. 2 is a plan view of the scale and readhead of FIG. 1.

FIG. 1 illustrates a scale 10 mounted on a first machine part (not shown) and a readhead 12 mounted on a second machine part (not shown). The second machine part and thus the readhead are movable relative to the scale in the direction shown by arrow A. FIG. 2 illustrates the scale 10 which has an incremental track 14 comprising a periodic pattern of scale marks 16 made up of alternate reflecting and non-reflecting lines. Reference mark 18 is embedded in the incremental track 14. Only one reference mark is shown embedded in the incremental track but as will be understood there can be a number of identical or unique reference marks embedded in the incremental track 14. Alternatively or additionally markings may be provided in a separate scale track, such as illustrated by reference mark 11. When there are several reference marks, the end user may wish to select a particular marking and ignore the other markings. Reference marks could be, for instance, used as limit marks which indicate the boundaries of relative motion of the readhead 12 and scale 10.

The readhead 12 is provided with standard incremental optics 2 for reading the incremental scale and reference mark and/or limit switch sensing optics 4 and 5 for reading the reference marks or limit marks.

Incremental scale may be manufactured in large quantities and it may be desirable to provide different patterns of reference marks and limit switches suitable for any particular application. Thus it may be advantageous to apply the reference marks and limit switches in a separate step from making the incremental scale.

Figure 3A:
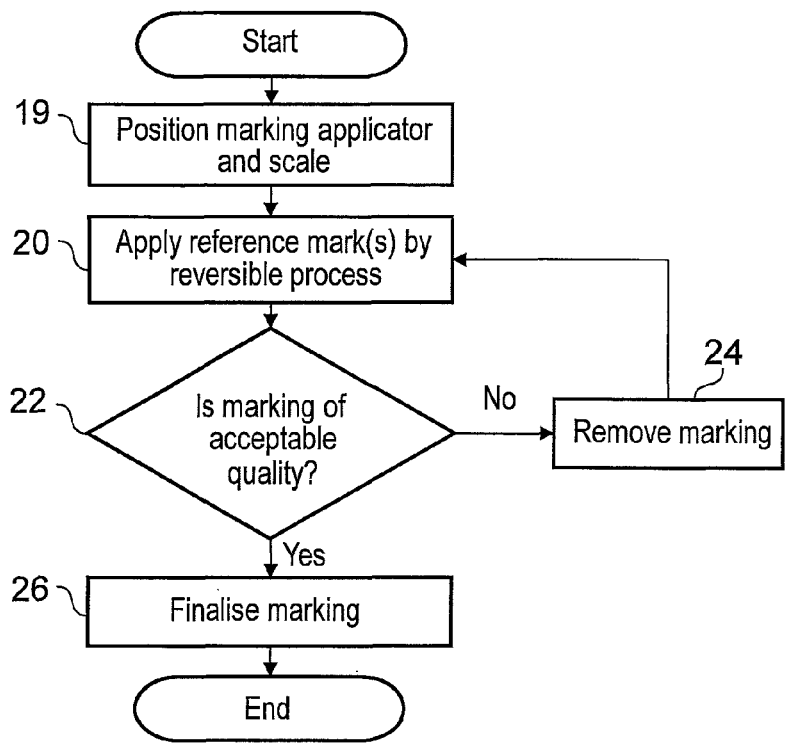
FIG. 3(a) is a flow diagram showing the outline of the method.

FIG. 3(a) is a flow diagram outlining the method of applying scale markings to a scale substrate. This method may be automated or carried out manually in situ; these alternatives will be described in more detail.

In a first step 19 a marking applicator and the scale substrate are positioned accordingly. A scale marking (or scale markings) is then applied to the scale substrate using a reversible process 20. In the described embodiment, a reagent, such as photo-curable ink, for example UV curable ink, is used which can be removed, for example by wiping with solvent and cloth.

In a third step, the applied marking is checked to determine whether it is of acceptable quality 22. This step may use criteria such as marking position, shape, density etc. The quality of the marking may be checked manually, e.g. a visual inspection by an operator or may be checked using an automated process.

If the markings pass the quality test, then the markings are finalised 26, for example by exposure to UV light, a particular chemical, heat or any other suitable finalising procedure. If the markings fail the quality test, then a removal process is used to remove at least the failed marking or either a subset or all of the markings 24. The markings are then reapplied using the above process.

Figure 3B:
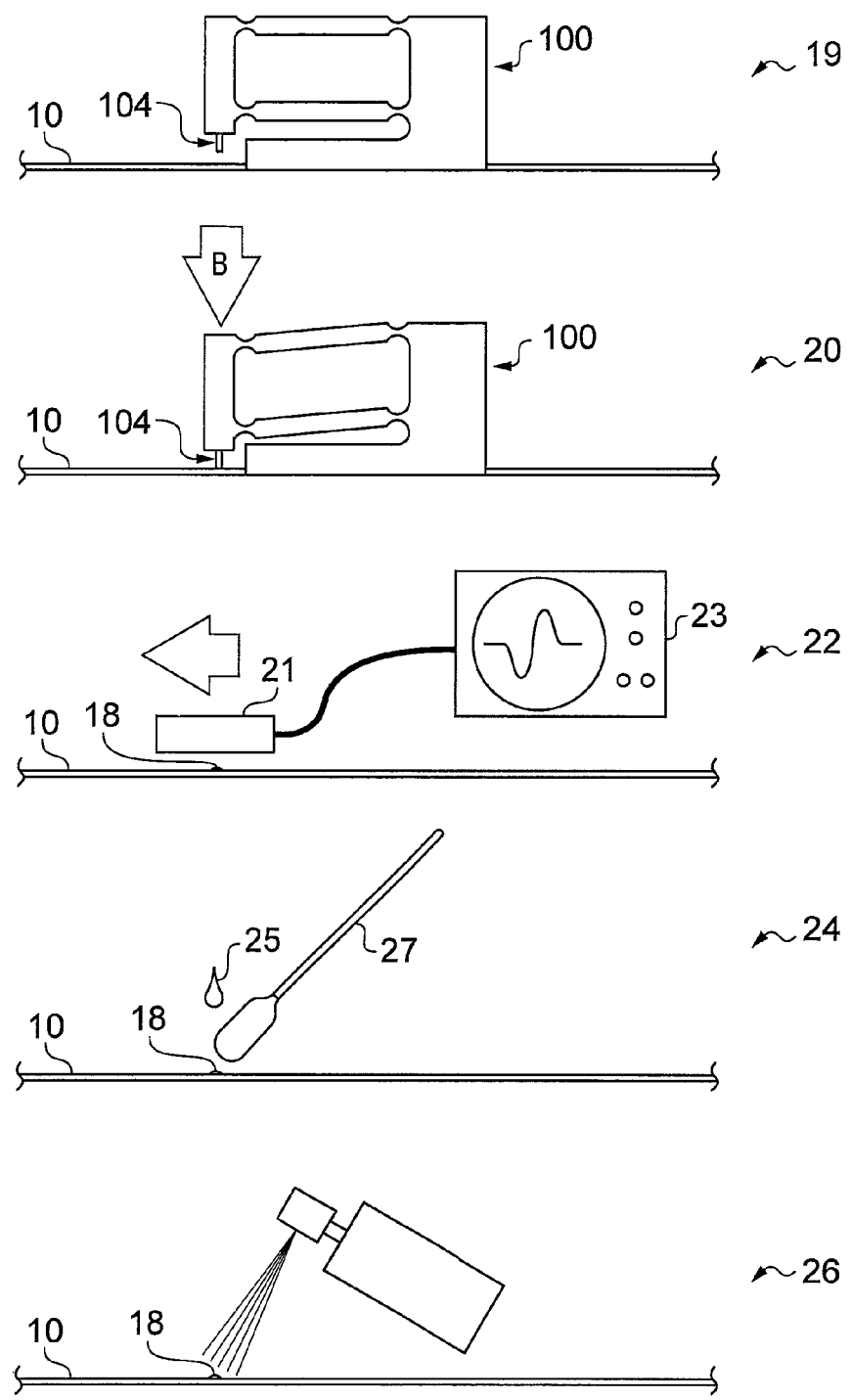

FIG. 3(b) schematically illustrates one embodiment of how each of these steps might be carried out. As shown, at the first step 19, an applicator 100, such as that described below in connection with FIG. 9 (or indeed any of the applicators described in connection with FIGS. 5 to 10c) is positioned relative to the scale substrate 10 in a desired position. The applicator 100 is then actuated by pressing down on it in the direction of arrow B, so that the marking is applied to the scale substrate 10. In this case, contact between the applicator's blade 104 and the scale substrate 10 causes a line of chemically curable ink, such as an epoxy, for instance, an epoxy that is the reaction product of epichlorohydrin and bisphenol-A, to be applied to the scale substrate 10. The quality of the marking is then checked by passing a readhead 21 over the reference mark. The output of the readhead 21 is displayed on an oscilloscope 23 (or for instance a computer display) so that the user can check the reference mark. In particular the user will be looking to check the quality of the reference mark such as the size, uniformity, and position of the reference mark. If it appears to the user that the quality of the reference mark is unacceptable then at step 24 the user can apply some solvent, for instance isopropyl alcohol ("IPA") 25, onto the marking and wipe the scale substrate clean using a swab 27, so as to remove the marking 18 completely leaving no evidence that it was ever on the scale substrate 10. Otherwise, at step 26 the user can finalise the marking, which in this embodiment comprises spraying it with a chemical, for instance a curing catalyst such as, for example, aliphatic polyamine or a polyamide, which on contact with the marking cures it so as to transform the marking from a liquid state into a solid state that has adhered to the scale substrate 10.

Figure 3C:
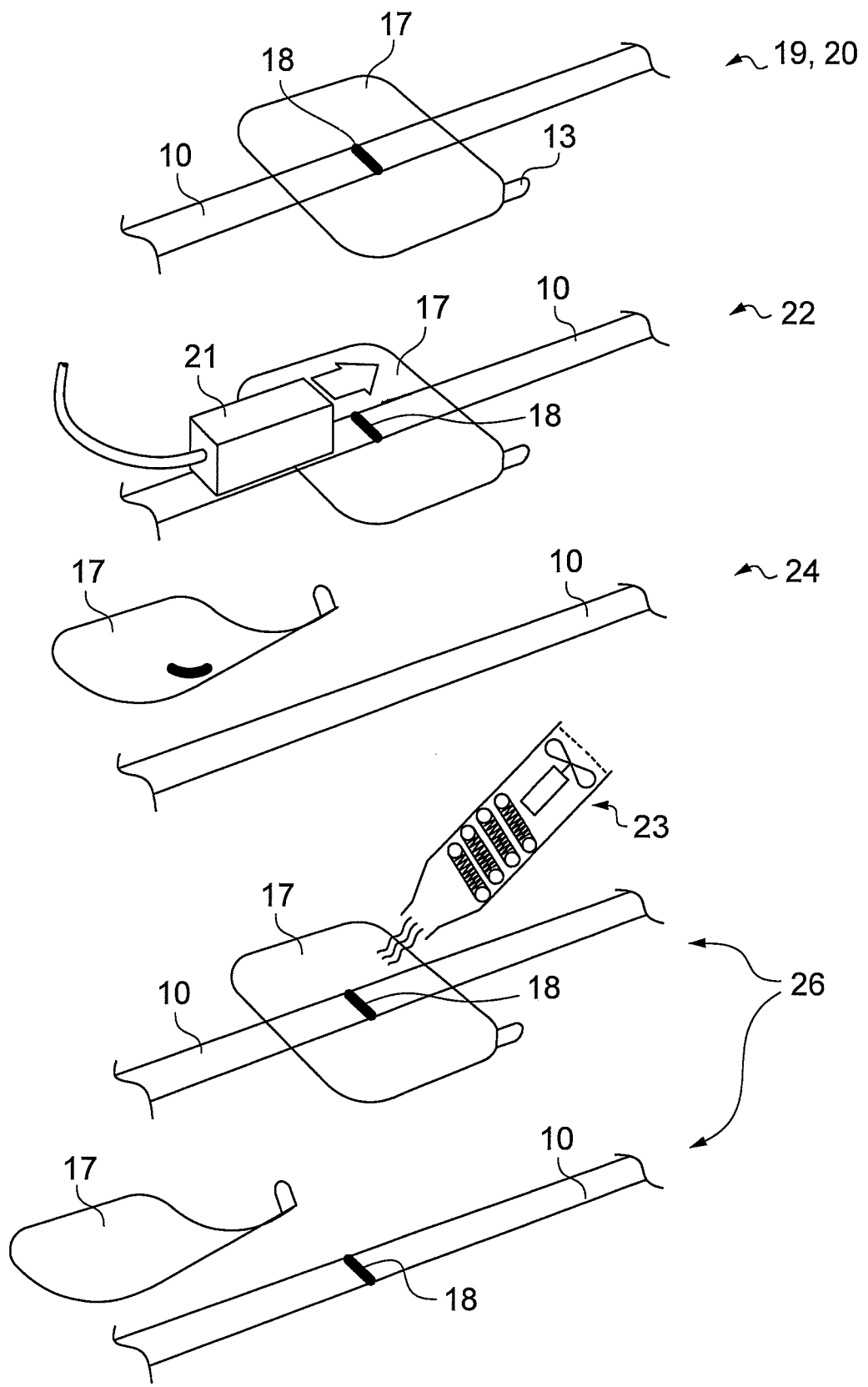

FIG. 3(c) schematically illustrates an alternative embodiment of how each of these steps might be carried out. In this case the marking 18 comprises a thermally transferrable decal made from polyester backed with a heat curing adhesive, such as the epoxy reaction product of epicholorohydrin and bisphenol-A with a heat-reactive cross-linking agent such as phenol-formaldehyde, which is carried on a marking carrier 17 made from polyester backed with a weak adhesive such as, for example, acrylic or polyvinyl acetate (PVA). As shown, the marking 18 is light absorbent and the marking carrier is transparent 17. A tab 13 which lacks adhesive is provided for ease of manipulation of the marking carrier 17. This decal marking 18 has a substantially uniform thickness of 5 µm and the marking carrier has a substantially uniform thickness of 100 µm. Although not shown in the figures, the marking carrier can comprise alignment marks for aiding alignment of the decal marking 18 and the scale substrate 10.

At the first step 19 the user peels the marking carrier 17 complete with decal marking 18 from a backing paper (not shown) so as to expose the weak adhesive layer on the back of the marking carrier 17 and then, via the tab 13, manipulates the marking 18 to a desired location over the scale substrate 10. At the second step 20, the user then brings the marking carrier 17 and decal marking 18 into contact with the scale substrate 10 so that the adhesive on the back of the marking carrier 17 sticks to the scale substrate 10. The decal marking 18 is then held in a provisional state on the scale substrate 10 and so its position can be checked at step 22 by passing a readhead 21 over it and checking the readhead's 21 output on an oscilloscope (not shown), or for instance a computer display, in a similar manner to that described above in connection with FIG. 3b. As the marking carrier 17 is transparent to the readhead 21 it has minimal effect on the readhead's 21 output and therefore gives a true representation of how the decal marking 18 will appear on the scale once it has been finalised. If it appears to the user that the quality of the reference mark is unacceptable then at step 24 then user can peel the marking carrier 17 and decal marking 18 off the scale substrate 10 so as to remove them completely, without leaving any deposits on the scale substrate and hence leaving no evidence that they were ever on the scale substrate. Otherwise, at step 26 the user can finalise the marking. In this embodiment, this comprises heating the decal marking 18 using a heat source 23 so as to cause adhesion of the decal marking 18 onto the scale substrate 10. As shown, the decal marking 18 can be heated by a directional heat source 23 which comprises a fan and at least one electrically resistive element which when powered generates heat. Accordingly, once the decal marking 18 has adhered to the scale substrate 10, the marking carrier 17 can be peeled off the scale substrate, leaving the thin decal marking 18 permanently in place on the scale substrate 10.

Again, the marking carrier 17 leaves no deposits on the scale substrate 10 and hence leaves no evidence that it was ever on the scale substrate. This process enables a very thin decal marking 18 to be applied to the scale substrate. The use of such a thin decal marking 18 helps to avoid the collection of debris at its edges, reduce the likelihood of peeling of the edges peeling, and helps maintain a shallow scale profile.

Figure 3D:
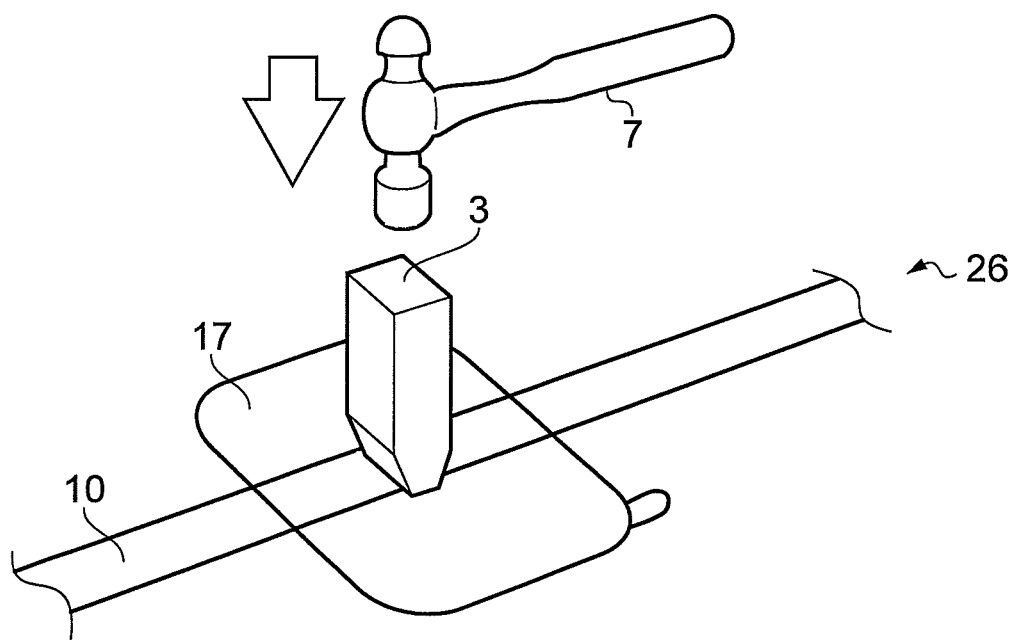
FIG. 3(d) is a schematic illustration of the finalisation step of FIG. 3a being carried out using impact means.

As will be understood, there are other ways of transferring decals onto a substrate. For instance the decal marking 18 could be impact transferrable. As illustrated in FIG. 3(d), in this case an impact element 3 having an end of similar shape and dimension to the marking 18 could be provided. At the finalising step 26, the impact element 3 could be placed on the marking 18 and then impacted via an impactor 7 so as to cause the decal to transfer onto the scale substrate by virtue of the pressure sensitive adhesive on the surface of the decal which faces the scale. Alternatively, the decal marking 18 could be transferrable on activation by a liquid, for instance water. Accordingly, at the finalising step decal marking 18 could be wetted causing it to adhere to the scale substrate 10.

Figure 4:
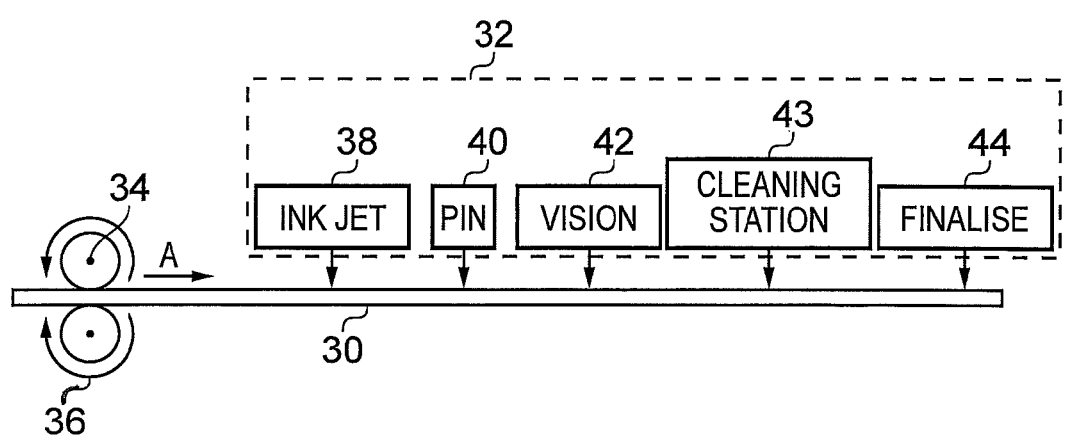

FIG. 4 is a schematic illustration of an automated process of applying the markings to a scale substrate. FIG. 4 is a continuous process but this method is also suitable for discrete lengths of scale. Furthermore, the method steps could be separated.

The scale substrate 30 is passed into the scale marking apparatus 32. The scale substrate may be fed in the direction of arrow A by known means, such as rollers 34, 36. Typically the scale substrate already has scale markings, for instance incremental scale markings, formed on it.

Any additional marking, for instance a reference marking, is applied to the scale substrate using, for instance, an ink jet printer 38. A curable ink which requires a separate curing step for the finalising step is chosen, for example a photo-curable ink A suitable ink would be a UV curable ink. A photo-curable ink may require pinning which is a partial cure sufficient to prevent beading of the ink whilst still allowing the ink to be removable. FIG. 4 shows a pinning step 40, which uses a UV light source used to pin the applied scale markings. The exposure time and intensity of this light source is controlled to ensure only cure the exposed surface of the ink, thereby forming a skin. As the ink has not fully or substantially cured the marking is still removable.

The scale substrate is then passed under a vision machine 42. This comprises a camera, light source and processor (not shown). The light source illuminates the scale and the camera produces an image of the marking which is assessed by the processor. An algorithm is used to determine whether the marking is of acceptable quality; the algorithm may use parameters such as width, edge quality, orientation, position, continuity and contrast in determining the quality of the markings. The vision system can be used to assess the cosmetic appearance of the marking in addition to other factors, such as its position.

If the markings fail the quality test, the substrate is taken to a cleaning station 43, where the lines are removed, for example by wiping with solvent.

If the markings pass the quality test, the substrate continues to a finalising station 44. In the case of a UV curable ink, the finalising station comprises a UV light source with an exposure time and intensity sufficient to substantially fully cure the ink.

The embodiment of FIG. 4 describes the use of a photo curable ink. However, other reagents may be used to apply the markings. The criteria for choice of reagents are that the application is reversible, with finalising being a separate step and that the applied reagent before it is finalised is detectable to enable checking. Preferably, the appearance of the marking pre and post finalising remains the same, so that the checking step gives a good indication of quality of the finalised marking.

An alternative to a photo curable ink is photo initiator etching. This would preferably entail the use of an opaque and stable photo initiator reagent which can be applied to the scale substrate. It should preferably be sufficiently opaque to be detectable by the vision inspection machine and sufficiently stable to not react with the scale substrate until activation in the finalising step. Once the markings have been applied and checked, the markings may be finalised using a light source to activate the reagent. The process may require an extra step of removing excess reagent once the marking has been etched.

This invention is particularly useful for markings to be applied to the scale substrate in situ. Incremental scales are used in a variety of applications, such as machine tools, pick and place machines, mask aligners, CMMs etc. Once the scale has been mounted in position, it may be desirable to place a reference mark at a certain position particular to that machine, for example in a 'home' position in the centre of the scale. Furthermore, it may be desirable to place limit switches on the scale to mark the end of allowable motion of movable parts. Preferably, any reference mark or limit switch is robust, particularly in harsh environment such as a machine tool. However applying markings in situ has the disadvantage that if the marking is incorrectly applied, the installed scale must be removed and replaced. Thus the present invention is particularly suitable for applying a marking in situ as it enables the marking to be checked before it is finalised to create a robust marking. If necessary, a wrongly applied marking can be removed and reapplied.

FIGS. 5(a), (b) and (c) illustrates a device 50 to aid an operator to correctly apply the marking. The device comprises an upper housing part 52 and a lower housing part 54. A scale locator comprising a groove 68 with parallel straight edges 70,72 is located on the bottom surface of its lower part 54. The device has an applicator in the form of a blade edge 62 of a blade 60 and a reagent storage region 64, 66 in the form of fine grooves 66 on the blade 60 leading to the blade edge 62. The blade is mounted on a side face of the upper part of the housing with its blade edge 62 perpendicular to the edges 70,72 of the groove 68. Two pins 56, 58 extend from the lower part of the housing into two apertures of the upper part of the housing, allowing motion up and down relative to the lower part of the housing. The upper part of the housing is biased away from the lower part by springs 59 located on the pins between the upper and lower parts.

In use the device is placed on a portion of scale substrate, so that the scale substrate fits into the groove, with at least one edge of the groove abutting the straight edge of the scale substrate. In this position, the blade is positioned above the scale substrate and perpendicular to the longitudinal, or measurement, axis of the scale substrate. The blade is not in contact with the scale substrate, due to the upper part of the housing being biased away from the lower part. To apply the reagent held in the reagent storage region to the scale, the housing is moved along the scale substrate to the desired position and then the upper part of the housing is depressed, bringing the blade edge into contact with the scale substrate. The upper part of the housing is then released.

Typically the reagent storage region contains a sufficient amount of reagent for one marking. The reagent storage region may be replenished by placing the blade edge against a reagent supply, such as an ink pad, enabling the reagent to travel into the reagent storage region by capillary action.

Once the marking has been applied to the scale substrate, it is checked for quality. This may be a visual check by an operator or alternatively the marking may be checked by passing a readhead over the scale and determining whether the marking has been detected. If the marking passes the quality test, it is finalised. The device may include a curing source, such as UV source in the housing. Alternatively, the marking may be finalised using a separate hand-held device, such as a UV pen.

In an alternative embodiment, the device could be mounted onto the mounting for the readhead, the scale locator thus comprising mounting fixtures instead of or as well as the grooves. For example the device may be provided with a fixture for mounting to the bolt holes of the machine provided for mounting of the readhead. Alternatively, the device could be mounted to the readhead itself, enabling the readhead to be used to check the marking whilst the device is attached. In such an embodiment, the ink or other reagent may be applied remotely, for example using air pressure generated by pushing a plunger to push the ink from the reagent storage area to the blade edge or remote operation via a tensile element to depress the upper housing part.

FIG. 6 shows an alternative device suitable for applying the marking. An adhesive mask 80 is provided with an alignment feature 82 in the form of an elongate line for aligning with the scale edge and an appropriately sized slit 84 for the marking. The adhesive mask is stuck onto the scale substrate, aligning the elongate line with the scale edge and placing the slit in the appropriate position for the marking.

The mask may comprise a laminate, for example a 3 ply laminate, which has sufficient thickness to be self supporting. The bottom layer is removed to expose a low tack adhesive layer, enabling the remaining 2 ply mask to be mounted to the scale; the remaining two layers still providing sufficient thickness to be self supporting. The top two layers are preferably transparent for ease of positioning the elongate line and slit. Once in place, the top layer is removed to leave a single layer of mask in place, which has the desired thickness of the resulting marking.

Ink may then be applied to the slot and excess ink removed by passing a blade over the top surface to leave just the slot full of ink. This may be inspected, and if acceptable, cured by means of, for example, a UV light source. Peeling off the mask will leave the cured mark adhered to the scale. If not cured, the mark may be wiped off, after mask removal, for example with IPA.

FIG. 7 shows an embodiment which uses a tampo printing technique to place the marking. An ink block 86 is provided with a groove 88 which is full of ink. The groove 88 is designed to hold the correct volume of ink for one marking and is shaped to give correct shape and transfer of the ink onto the scale substrate. The block may be loaded with ink using techniques such as inkjet delivery or an ink pad. The block is then placed onto the scale substrate, with the groove in the desired position of the marking, to transfer the ink to the scale substrate. The block may be used in a device which gives correct alignment, for example in place of the blade in FIG. 5. Once the ink has been transferred to the scale substrate, the marking can be checked and finalised, as in previous embodiments.

FIG. 8 shows an alternative design of ink blade 90, suitable for use with the device of FIG. 5. An ink blade body is provided with an ink reservoir 92 to hold sufficient ink for a single marking and ink transfer channels 94 between the reservoir and the blade edge 96. The reservoir and channels are covered by a flexible cover 98, such as foil, which can be depressed to expel the ink.

FIG. 9 shows an alternative embodiment of the device for applying the mark. The device is a body 100 with a base 102 having a scale locator comprising a groove for engaging with the scale substrate, in the same way as FIG. 5. The body 100 holds an applicator 104, for example a blade as in FIG. 5 or 8 or a block as in FIG. 7. A region of the body is resilient, for example due to reduced thickness, thus enabling the applicator to be pushed against the scale substrate.

The thickness of the scale marking is dependent on the thickness of the applicator, for example the blade edge in FIGS. 5, 8 and 9. If too much ink 110 gathers at the tip of the blade 112, as illustrated in FIG. 10A, the marking may become wider than desired. FIG. 10B illustrates a scraper 114 for scraping excess ink from the blade. The scraper comprises a housing 114 which holds an ink reservoir 116, for example an ink pad. Two round edged scraper blades 118 are positioned above the ink reservoir, so that a blade inserted into the ink reservoir must be pushed through the space 120 between the scraper blades. On removal of the blade from the reservoir, excess ink is thus removed from the sides of the blade by the scraper blades.

FIG. 10C illustrates a blade tip 112 after it has been removed from the scraper of FIG. 10B. Ink has been removed from the side of the blade tip 112, leaving a bead of ink 122 at the tip. A similar result could also be achieved by, for instance, coating the sides of the blades 112 with a surface having a low coefficient of friction, such as polytetrafluoroethylene.

It is also desirable to be able to apply a temporary reference mark to a scale substrate. For example, big machines will have large lengths of scale and it may be desirable to work within a small working area on the machine. In this case, it would be useful to apply a temporary reference mark to the scale to define the small working area. This temporary reference mark can be removed once the work is finished.

In a first embodiment of temporary reference mark, a solvent based ink is used to apply the marking. As a solvent based ink is used, no curing is necessary. An ink is chosen which is removable using a solvent, for example acetone or xylene. Preferably, the marking can be cleaned with a separate solvent, such as isopropyl alcohol without removing the marking. Thus a robust marking is produced which can be removed when no longer required.

In a second embodiment, a marking is located on a transparent adhesive carrier. This carrier may have a similar design to the sticker in FIG. 3c. The carrier is placed onto the scale substrate with the marking in the appropriate position and held in place by the adhesive. This marking may be used as a temporary reference mark, by choosing an adhesive which enables the carrier to be applied and removed. Alternatively, it could be used as a permanent reference mark, by choosing an adhesive which is permanent, for example the adhesive may be photo-initiated, e.g. by exposure to UV light.

In the above described embodiments, the encoder is an optical encoder, with the incremental scale being defined by a series of reflective and non-reflective features detectable by the readhead. In the embodiments described, the reference mark is a non-reflective, i.e. light absorbent, feature that is a number of periods wider than an incremental feature. As will be understood, there are other ways of making an optically detectable reference mark, for instance by providing a light scattering reference feature, a specular reference feature with the reflecting surface that steers illumination light in a different direction to that reflected from a specular substrate, or a refracting reference feature that directs or shapes illumination light in a way that differs to the surrounding material, e.g. a cylindrical lens on a plane glass surface. Furthermore, the scale could be a transmissive scale and comprise a series of transmissive and opaque features.

In the above described embodiments, the scale's position features and the reference mark are defined by features having optical properties that are detectable by the readhead. However, it will be understood that this need not necessarily be the case and for instance the incremental position features and/or reference marks can be formed by features having different properties. For instance, as is well known, features having different magnetic, capacitive or inductive properties can be used to encode position information onto a scale. In these cases an appropriate magnetic, capacitive or inductive sensor arrangement will be provided in the readhead.

Furthermore, it will be understood that the scale's position features and the reference mark need not be detectable via the same type of property. For instance, the scale's position features could be defined by features having particular optical properties whereas the reference mark could be defined by a feature having a particular magnetic, capacitive or inductive property.

As will be understood, in the case of a magnetic encoder, the scale can be passive or active. An example of passive scale could be a ferrous material with regular slots. Active scale could be fabricated from magnetised lamina stacked along the measuring direction or by selectively setting the polarisation of a series of sections of a magnetic strip. A reference marking on such magnetic scale could operate and be detectable by it altering the permeability of the space between the scale and readhead. For example, the reference marking could comprise an ink loaded with ferrous particles (which could be magnetic or ferromagnetic). Such an ink could be used to fill one or more slots in passive magnetic scale to provide a measureable disruption to the periodic permeability of the surface or bridge one or more pole junctions in active scale to give a measureable disruption to the periodic flux pattern near the scale. The ink could be initially provided on the scale in a fluid and hence provisional state and once checked could be cured in any of the manners described above in order to finalise it.

In the case of capacitive scale, a reference mark could be one that changes the permittivity of the space between the readhead and scale which is detectable by a capacitive detector. An ink with significantly different dielectric constant (or loaded to be so) compared to the surroundings (usually free space) could be deposited on the measuring scale to provide a detectable disruption to the periodic capacitive surface. As with the above described embodiments, the ink could be initially provided on the scale in a fluid and hence provisional state and once checked could be cured in any of the manners described above in order to finalise it.

As will be understood, the invention is not limited to the application of marks on incremental scales but could also be used for instance with absolute scales, and in particular for applying limit marks to an absolute scale.

Furthermore, the invention is suitable for use with linear and rotary scales (for instance ring scales), and for scales providing measurement information in one or more measuring dimensions. For example, the invention is also suitable for use with scales providing measurement information in two dimensions.

The invention claimed is:

1. An apparatus for applying a marking to a scale substrate, comprising:
    a scale locator for positioning the apparatus in a defined position relative to the scale substrate in one dimension;
    an applicator for locating one or more markings on the scale substrate in a provisional state in which the one or more marking can be removed;
    a detector for checking the markings in the provisional state; and
    a finalizer for finalizing the one or more markings which are acceptable after the detector checks the markings in the provisional state so as to transform the one or more markings into a permanent state in which the one or more markings are less readily removable than in the provisional state.

2. An apparatus as claimed in claim 1, further comprising a remover for removing from the scale substrate one or more markings which are not acceptable.

3. An apparatus as claimed in claim 1, in which the applicator locates the one or more marking by applying a marking to the scale substrate.

4. An apparatus as claimed in claim 3, in which the applicator applies the marking in a liquid state.

5. An apparatus as claimed in claim 4, in which the liquid comprises an ink.

6. An apparatus as claimed in claim 4, in which the finalizer transforms the one or more markings into a solid state.

7. An apparatus as claimed in claim 6, in which the finalizer cures the one or more markings.

8. An apparatus as claimed in claim 3, in which the applicator applies the marking in a solid state.

9. An apparatus as claimed in claim 8, in which the marking comprises an adhesive for securing the marking to the scale substrate and the finalizer transforms the adhesive.

10. An apparatus as claimed in claim 1, in which the applicator locates the one or more marking by positioning a marking carrier adjacent the scale substrate and the finalizer finalizes the one or more markings by transferring the marking from the marking carrier onto the scale.

11. An apparatus as claimed in claim 1, in which the finalizer finalizes the one or more markings by exposing the one or more markings to an electromagnetic radiation ("EMR") source.

12. An apparatus as claimed in claim 11, in which the EMR source is an ultraviolet ("UV") source.

13. An apparatus as claimed in claim 1, in which the detector checks the markings by checking the position of the marking.

14. An apparatus as claimed in claim 1, in which the finalizer finalizes the one or more markings by exposing the one or more markings to a heat source.

15. An apparatus as claimed in claim 1, in which the finalizer finalizes the one or more markings by applying pressure to the one or more markings.

16. An apparatus as claimed in claim 1, in which the one or more markings comprises a reference mark.

17. An apparatus as claimed in claim 1, further comprising a pinner for pinning the marking prior to finalization.

18. An apparatus comprising:
    a scale comprising a series of position features defining an incremental or absolute track; and
    a device for applying a reference mark onto the scale, the device carrying marker matter which can be applied to a scale substrate in a provisional state in which the marker matter can be removed and subsequently transformable into a permanent state in which the marker matter is less readily removable than in the provisional state on the scale substrate via a finalization procedure.

19. An apparatus as claimed in claim 18, in which the device comprises a storage region for the marker matter and an applicator for transferring the marker matter from the storage region onto a scale substrate.

20. An apparatus as claimed in claim 19, in which the marker matter is a liquid and the applicator comprises at least one conduit for transferring the marker liquid from the storage region onto a scale substrate.

21. An apparatus as claimed in claim 18, in which the marker matter comprises an object comprising an adhesive backing that is transformable into a permanent state on the scale substrate via a finalization procedure.

22. An apparatus as claimed in claim 18, in which the marker matter is a decal and the device comprises a decal carrier sheet.

23. An apparatus as claimed in claim 22, in which the decal carrier sheet does not interfere with the detection of markings on a scale substrate on which the decal carrier is placed.

24. An apparatus as claimed in claim 18, in which the device comprises features for aiding alignment of the marking to the scale substrate.

25. An apparatus as claimed in claim 24, in which the device comprises a scale locator for positioning the device in a defined position relative to the scale substrate in at least one dimension.

26. An apparatus as claimed in claim 18, further comprising a tool for finalizing the marking.

27. An apparatus for applying a reference mark to a scale substrate comprising incremental or absolute scale features, the apparatus comprising:
    a scale locator for positioning the apparatus in a defined position relative to the scale substrate in at least one dimension;
    a marker matter storage region comprising marker matter; and
    an applicator which provides a conduit for the marker matter from the marker matter storage region to the scale substrate, in which the marker matter can be applied to a scale substrate in a provisional state in which the marker matter can be removed and subsequently transformable into a permanent state in which the marker matter is less readily removable than in the provisional state on the scale substrate via a finalization procedure.

28. An apparatus as claimed in claim 18, in which the marker matter comprises a photo-curable liquid.

29. An apparatus as claimed in claim 28, in which the photo-curable liquid comprises an ultraviolet ("UV") curable ink.

30. An apparatus as claimed in claim 27, in which the marker matter comprises a photo-curable liquid.

31. An apparatus as claimed in claim 30, in which the photo-curable liquid comprises an ultraviolet ("UV") curable ink.

* * * * *